United States Patent [19]

Aiken

[11] Patent Number: 4,970,992
[45] Date of Patent: Nov. 20, 1990

[54] PORTABLE TEAT DIPPING APPARATUS

[76] Inventor: Luke T. Aiken, R.D. #2, Box 128-A, Sheffield, Vt. 05866

[21] Appl. No.: 454,941

[22] Filed: Dec. 22, 1989

[51] Int. Cl.⁵ ............................................. A61D 11/00
[52] U.S. Cl. ..................................... 119/158; 119/156
[58] Field of Search ................... 119/14.01, 14.08, 156, 119/157, 158, 159

[56] References Cited

U.S. PATENT DOCUMENTS

| | | |
|---|---|---|
| 3,529,577 | 9/1970 | McMenemy, Jr. ................. 119/158 |
| 3,713,423 | 1/1973 | Sparr, Sr. ......................... 119/158 X |
| 3,828,776 | 8/1974 | Sparr, Sr. ......................... 119/158 X |
| 4,305,346 | 12/1981 | Sparr, Sr. ......................... 119/158 X |

Primary Examiner—Gene Mancene
Assistant Examiner—R. Thomas Price
Attorney, Agent, or Firm—Thomas N. Neiman

[57] ABSTRACT

The improved apparatus has a portable reservoir that contains a top element with a cup. A holder is designed to maintain the reservoir in position. An attachment strap is connected to the reservoir and allows the apparatus to be positioned at a point below the knee by the use of a buckle arrangement. The apparatus allows the user to disinfect the cow directly after milking has been completed with a minimum amount of effort, thereby providing a more sanitary environment that will result in lower potential for diseases, such as, mastitis.

1 Claim, 2 Drawing Sheets

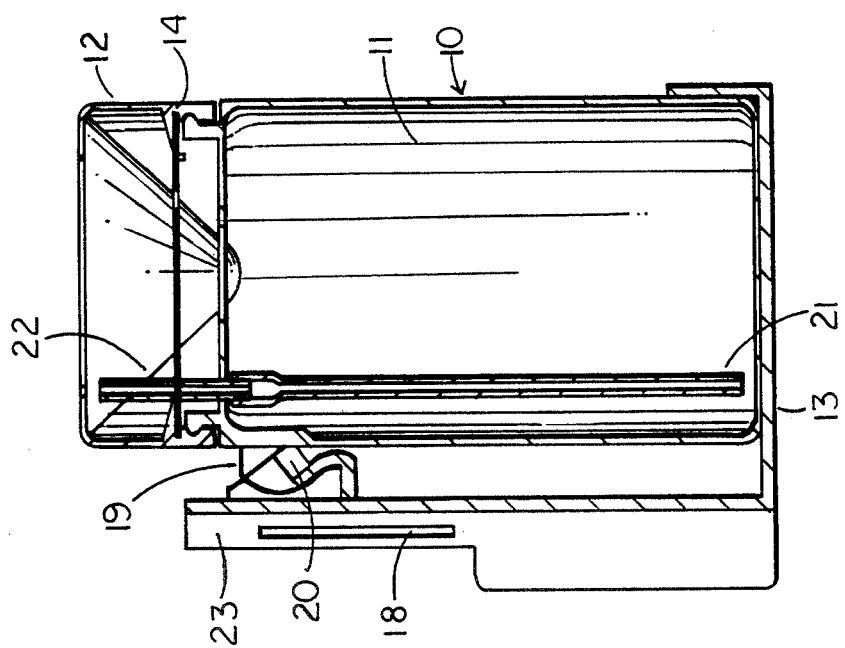
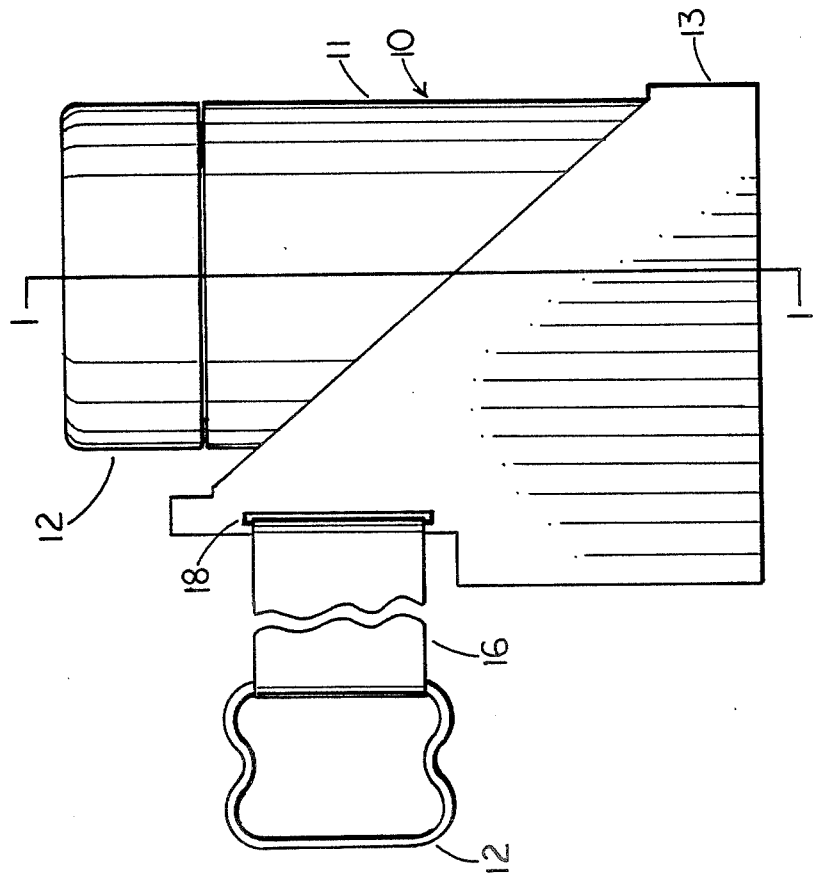

PORTABLE TEAT DIPPING APPARATUS

This invention pertains to dairy farming devices, and in particular to such dairy farming devices that are designed to provide a portable teat dipping apparatus that will permit the disinfection of dairy cow udders following milking procedures with a minimum of effort.

The field of dairy farming is old and has many current applications for disinfecting dairy cows. It has been well documented of the need to properly disinfect dairy cows after milking to prevent diseases, such as mastitis that can be caused by unsanitary conditions found in the tie barn. A number of devices have been developed to attempt to assist individuals who operate dairy farms and milk cows. Examples of these devices that are sometimes used are drinking cup type devices that are carried by individuals from place to place in the barn, are placed down while the cow is milked and then used after milking. Unfortunately, what sometimes occurs is that a number of animals are milked before they are properly disinfected because it is simply easier to pick up the dipper and disinfect many animals at once. However, it has been shown to be much more effective to disinfect immediately after milking. The limitations of the current devices are that they require constant moving of the dipper from one animal to another, while at the same time handling the milking apparatus. This is cumbersome and awkward, to say the least. It is an object of this invention to teach a portable teat dipping apparatus that provides easy access while in the squatting position of milking dairy cows in a tie barn to encourage prompt disinfection.

Clearly, it is desirable for a portable teat dipping apparatus that does not contain the limitations described above and at the same time is simple and practical to operate. It is the object of this invention, then to set forth an improved portable teat dipping apparatus which avoids the disadvantages limitations, above-recited, which obtain in disinfection devices.

It is also the object of this invention to teach a portable teat dipping apparatus which is simple to install and use. It is another object of this invention to teach a portable teat dipping apparatus that enables the operator to have a readily accessible reserve storage capacity that can improve speed and continuity during operations. Particularly, it is the object of this invention to set forth a portable teat dipping apparatus, for use with dairy cattle in tie barn operations, comprising a reservoir; said reservoir comprising fluid retaining means; top means connected to said reservoir; said top means having cup means therein for disinfecting the teat of the cow; means for replenishing said cup from said reservoir; holder means for said reservoir and said top means; means for replaceable attaching said holder to the leg of the operator; said replaceable attaching means having belt means; and replaceable attaching means further having buckle means.

Further objects and features of this invention will become more apparent by reference to the following description taken in conjunction with the accompanying figures, in which:

FIG. 1 is a side cross sectional view taken along line 1—1 of FIG. 2;

FIG. 2 is a side elevational view of the novel portable teat dipping apparatus;

FIG. 3 is a top view of the holder means without the top on;

Figure 3:
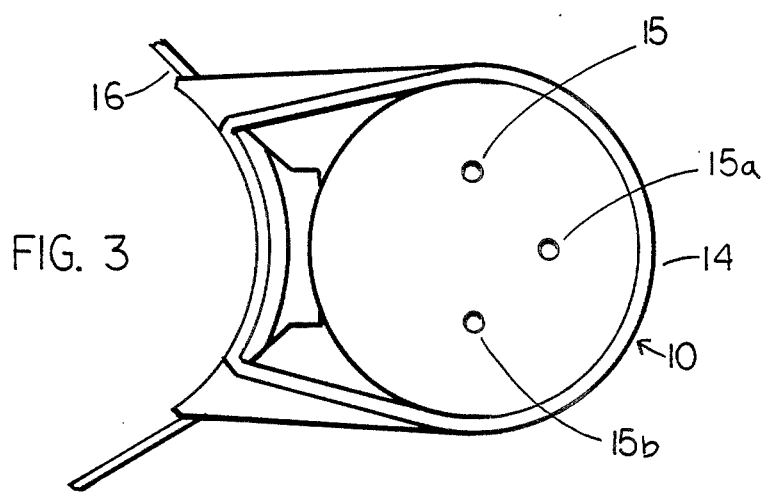
Figure 4:
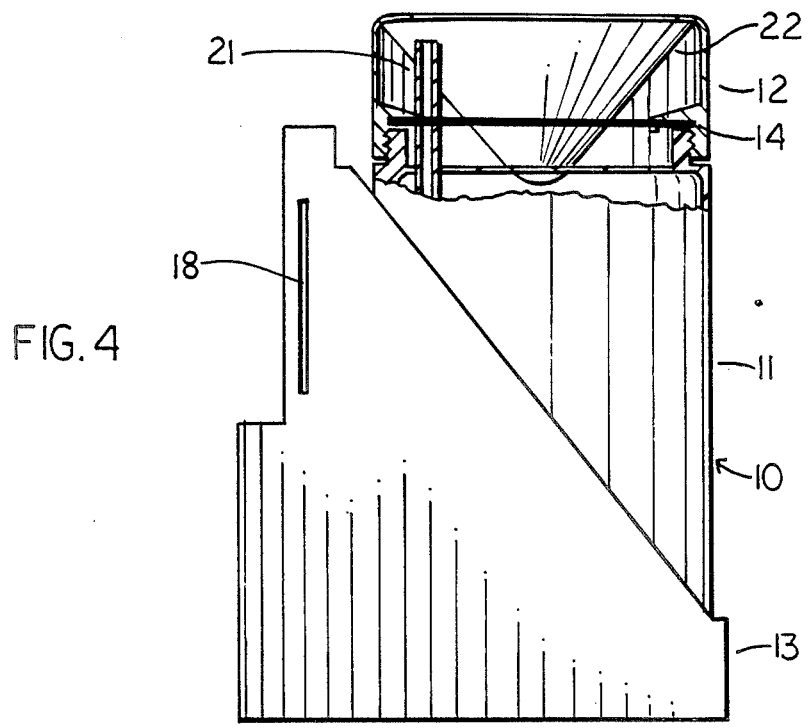
FIG. 4 is a side view of the apparatus showing a cross sectional view of the top section of the novel apparatus.
Figure 5:
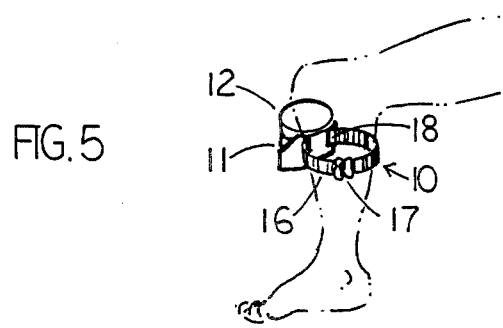
FIG. 5 is a perspective view of the novel apparatus in position on the leg of the operator.

As shown in the figures, the portable teat dipping apparatus 10 has reservoir 11 that contains the disinfecting solution for use with the dairy cows. The reservoir 11 has a top 12 that can be attached to the reservoir 11 in a number of ways. For example, in the embodiment shown if FIG. 1 the top 12 is screwed on the reservoir. A gasket 14 is positioned between the reservoir 11 and the top 12 to provide a complete seal when the top 12 is tightened down. A holder 13 is provided that supports both the reservoir and the top of the apparatus. Holes 15, 15a and 15b are provided at the bottom of the holder 13 to allow drainage for any spillage of the disinfectant. The reservoir and top can simply slide in the holder as shown in FIGS. 2 and 4 or a locking arrangement can be provided. The locking arrangement consists a spring clip 19 on the reservoir and a receiving slot 20 in the upper end 23 of the holder 13 as shown in FIG. 1. A belt loop 18 in the holder allows a support strap 16 to pass through. The strap has a buckle 17 which allows the user to tighten the apparatus on his or her leg at a point below the knee. The top has a cup 22 recessed into the top. This unit is designed to hold the disinfectant and fit over the teat of the animal. A replenishment tube 21 allows the operator to resupply the cup 22 with disinfectant as necessary.

The operator refills the cup 22 by squeezing the reservoir 11 which drives the disinfecting solution up the replenishment tube 21 and into the cup 22 of the top 12.

In operation, the operator fills the reservoir with disinfectant and then replaces the top on the apparatus and places the top and reservoir unit in the holder. The unit is then strapped to the leg at a position slightly below the knee. After the cows are attached to the milking apparatus and milked. Following this procedure, the milking apparatus is removed from the animal and the operator positions the portable teat dipping apparatus under the udder and then disinfects the animal's teats. He or she can then move directly to the next animal without having to handle the apparatus which their hands free to deal with the milking machine.

While I have described my invention in connection with specific embodiments thereof, it is clearly to be understood that this is done only by way of example and not as a limitation to the scope of my invention as set forth in the objects thereof and in the appended claims.

I claim:

1. Portable teat dipping apparatus, for use with dairy cattle in tie barn operations, comprising:
   a reservoir;
   said reservoir comprising fluid retaining means;
   said fluid retaining means comprises a flexible cylindrical container;
   top means connected to said reservoir;
   said top means having connection means for uniting said top means to said reservoir;
   said connection means comprising a male/female threaded joint;
   said joint having gasket means interposed;
   said top means further having cup means therein for disinfecting the teat of the cow;
   means for replenishing said cup means from said reservoir;

said replenishing means comprising a tube from said reservoir to said cup for permitting resupply of said cup by squeezing said flexible cylindrical container;
holder means for said reservoir and said top means;
said holder means comprising retaining means for inserting said reservoir and said top means;
said holder means having apertures for proper draining of the overflow of said cup;

means for replaceable attaching said holder to the leg of the operator;
said replaceable attaching means having belt means;
said holder means further having apertures for allowing said belt means to be secured to said holder means; and
said replaceable attaching means further having buckle means.

* * * * *